United States Patent
Lee et al.

(10) Patent No.: US 8,180,221 B2
(45) Date of Patent: May 15, 2012

(54) WAVELENGTH-DIVISION MULTIPLEXED PASSIVE OPTICAL NETWORK FOR REDUCING DEGRADATION IN NOISE CHARACTERISTIC OF WAVELENGTH-LOCKED FABRY-PEROT LASER DIODES

(75) Inventors: Chang-Hee Lee, Daejeon (KR); Sil-Gu Mun, Daegu (KR); Kun-Youl Park, Pusan (KR)

(73) Assignee: Korea Advanced Institute of Science and Technology (KR)

( * ) Notice: Subject to any disclaimer, the term of this patent is extended or adjusted under 35 U.S.C. 154(b) by 610 days.

(21) Appl. No.: 11/991,207

(22) PCT Filed: Aug. 29, 2006

(86) PCT No.: PCT/KR2006/003405
§ 371 (c)(1),
(2), (4) Date: Apr. 14, 2009

(87) PCT Pub. No.: WO2007/027042
PCT Pub. Date: Mar. 8, 2007

(65) Prior Publication Data
US 2010/0221008 A1 Sep. 2, 2010

(30) Foreign Application Priority Data
Aug. 29, 2005 (KR) .................. 10-2005-0079241

(51) Int. Cl.
*H04J 14/02* (2006.01)
(52) U.S. Cl. .................. 398/68; 398/70; 398/71
(58) Field of Classification Search .................. 398/68, 398/70–72
See application file for complete search history.

(56) References Cited

U.S. PATENT DOCUMENTS 7,073,956 B1 * 7/2006 Shin et al. .................. 385/89
(Continued)

OTHER PUBLICATIONS

PCT Application No. PCT/KR2006/003405, International Search Report mailed Dec. 15, 2006, 3 pgs.

(Continued)

*Primary Examiner* — Leslie Pascal
(74) *Attorney, Agent, or Firm* — Schwegman, Lundberg & Woessner, P.A.

(57) ABSTRACT

The present invention relates to a wavelength-division multiplexed passive optical network (WDM-PON) for reducing degradation in noise characteristic of a wavelength-locked Fabry-Perot Laser Diode (F-P LD). A WDM-PON for reducing degradation in a noise characteristic of a wavelength-locked F-P LD in accordance with the present invention comprises a central office (CO); a remote node (RN) being connected to the CO by a single mode fiber; and one or more optical network terminations (ONTs) being connected to the RN by one or more single mode fibers, respectively, wherein the CO comprises: a broadband light source (BLS) for generating light to be injected; a first wavelength-division multiplexing (WDM) filter for filtering for the injected light generated from the BLS and having a bandwidth wider than a bandwidth of the injected light in order to minimize a filtering effect; and one or more optical transceiver having one or more F-P LDs into which light being filtered by the first WDM filter is injected; and wherein the RN filters the injected light generated from the BLS and injects the filtered light into the one or more ONTs; and wherein the RN comprises a second WDM filter having a bandwidth wider than a bandwidth of the injected light in order to minimize a filtering effect.

9 Claims, 3 Drawing Sheets

U.S. PATENT DOCUMENTS

2005/0074240 A1* 4/2005 Jung et al. .................. 398/72
2008/0232807 A1* 9/2008 Lee et al. .................... 398/87
2009/0092390 A1* 4/2009 Lee et al. .................... 398/72

OTHER PUBLICATIONS

PCT Application No. PCT/KR2006/003405, Written Opinion mailed Dec. 15, 2006, 4 pgs.

Baik, J.-S., et al., "Polarization and Temperature-Tolerant Wavelength-Locked WDM Source with External ASE Injection", *Conference on Lasers and Electro-Optics, 2004 (CLEO)*, 3 pgs.

Lee, S.-M., et al., "Dense WDM-PON Based on Wavelength-Locked Fabry-Pérot Laser Diodes", *Photonics Technology Letters*, 17(7), (2005), 1579-1581.

* cited by examiner

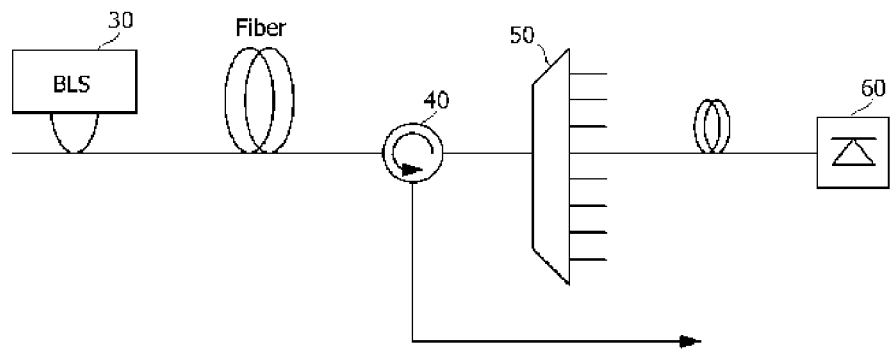
[Fig. 1]
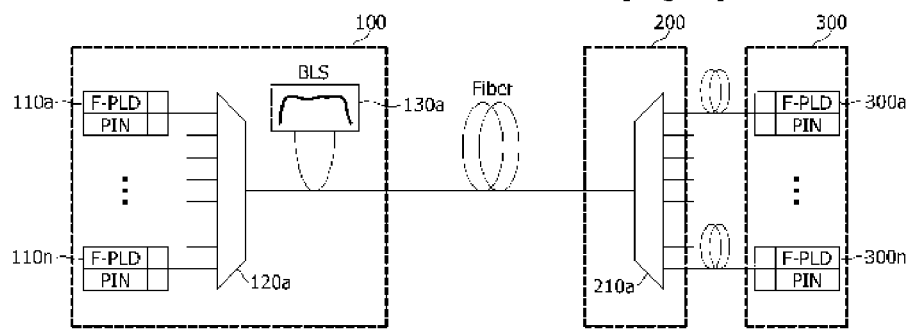
[Fig. 2]
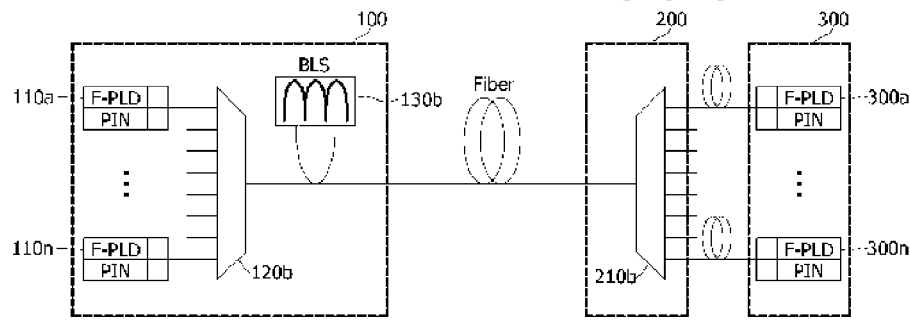
[Fig. 3]
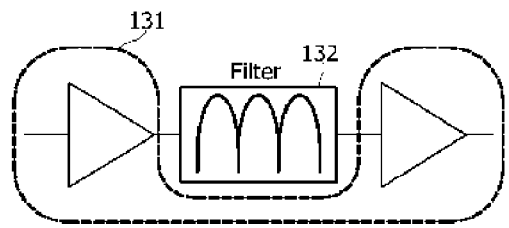
[Fig. 4]
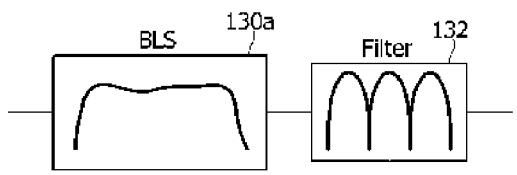
[Fig. 5]

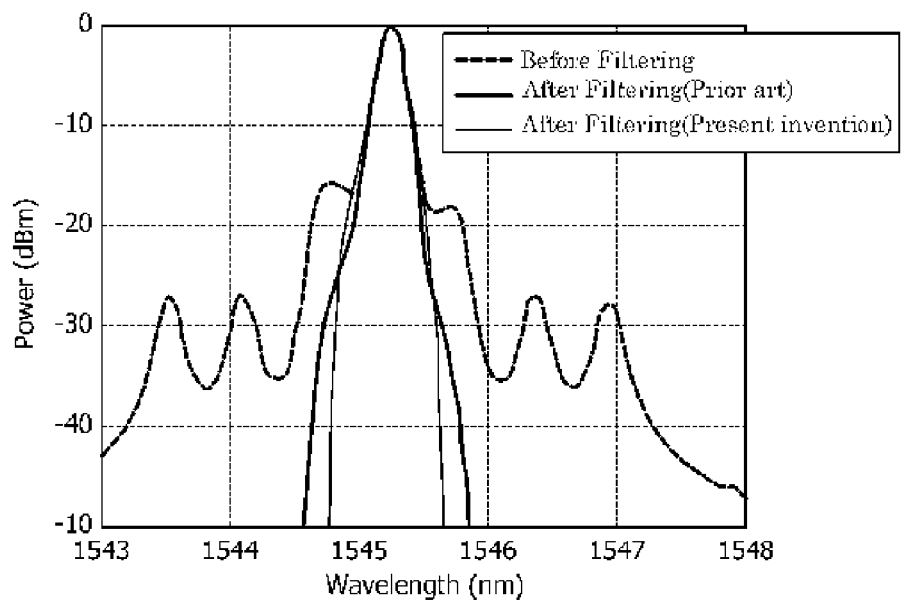
[Fig. 6]
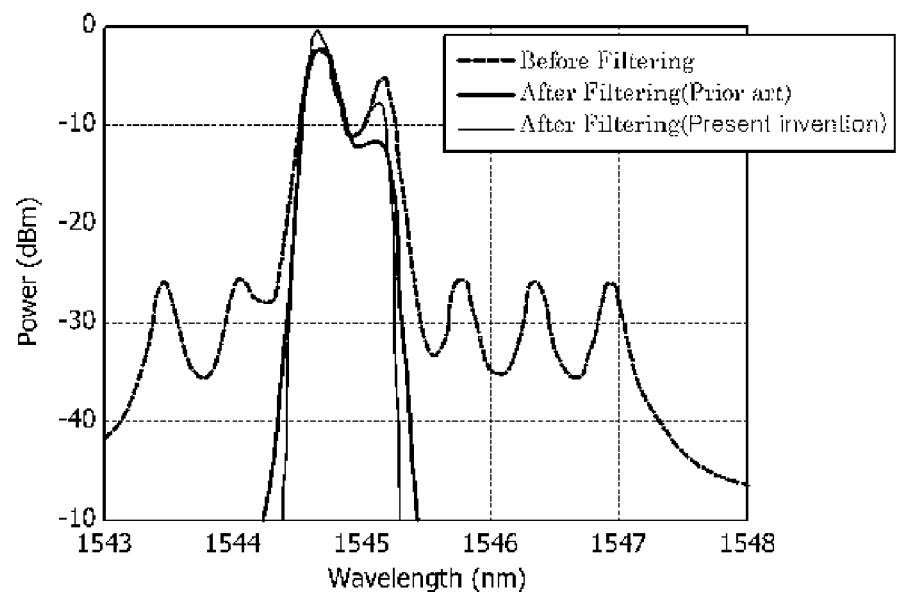
[Fig. 7]
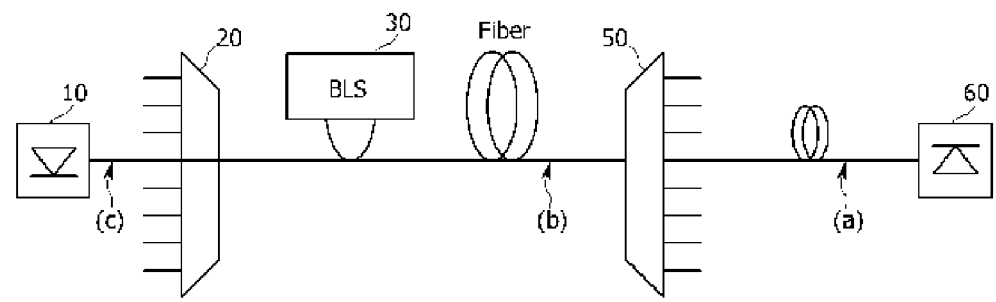
[Fig. 8]

[Fig. 9]
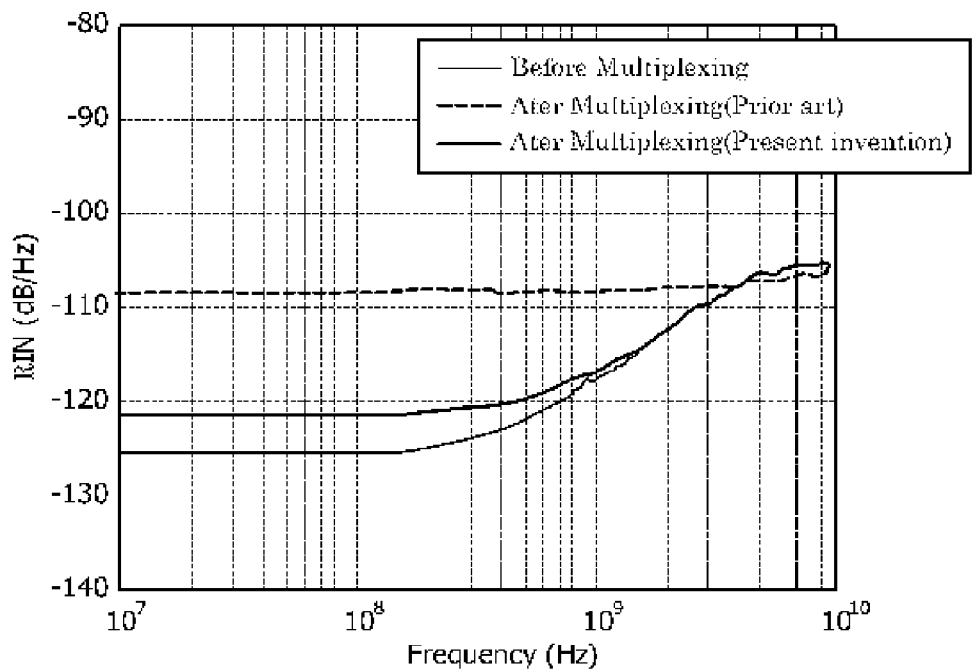
[Fig. 10]
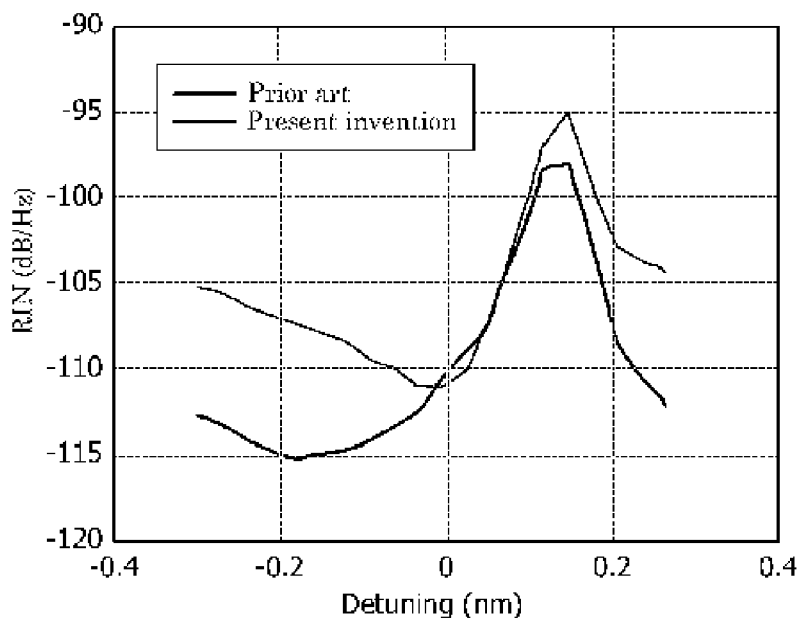

WAVELENGTH-DIVISION MULTIPLEXED PASSIVE OPTICAL NETWORK FOR REDUCING DEGRADATION IN NOISE CHARACTERISTIC OF WAVELENGTH-LOCKED FABRY-PEROT LASER DIODES

RELATED APPLICATION

This application is a nationalization under 35 U.S.C. 371 of PCT/KR2006/003405, filed Aug. 29, 2006 and published as WO 2007/027042 A1 on Mar. 8, 2007; which claimed priority under 35 U.S.C. 119 to Korean Patent Application Serial No. 10-2005-0079241, filed Aug. 29, 2005, which applications and publication are incorporated herein by reference and made a part hereof.

TECHNICAL FIELD

The present invention relates to a wavelength-division multiplexed passive optical network (WDM-PON) for reducing degradation in noise characteristic of a wavelength-locked Fabry-Perot Laser Diode (F-P LD). More specifically, the present invention relates to a WDM-PON capable of a high speed transmission of 1 Gb/s or more by using a noise reduction effect of a wavelength-locked F-P LD maximally, capable of guaranteeing wavelength-independence sufficiently even when the wavelength of an F-P LD and the wavelength of a wavelength-division multiplexing filter may vary depending on a change of ambient temperature, and capable of minimizing crosstalk by an adjacent subscriber channel.

BACKGROUND ART

Demand on a high speed of an optical network is rapidly increased as voice and text oriented services have evolved to video based services due to a rapid expansion of Internet. An average bi-directional transmission bandwidth to be guaranteed to a subscriber in a future optical network is required to be 100 Mb/s or more and a transmission distance must satisfy 20 km or more which is an established international standard based on a distance between a central office and a subscriber.

However, in the existing copper-wire based optical network, there is a limit in bandwidth available for each subscriber. Accordingly, an FTTH (Fiber-To-The-Home) is the only single possible alternative which can provide services by installing a single mode optical fiber to a subscriber, in order to meet the above requirements. Among various methods of building an FTTH, a WDM-PON has been perceived to be an ultimate solution where it is possible to provide subscribers with a bandwidth of 100 Mb/s or more like a bandwidth obtained in a point-to-point connection case while saving amount of using optical fiber and to guarantee a high quality of service (QoS).

In a WDM-PON, because separate wavelengths are used for respective subscribers when communicating with a central office (CO), each subscribers and the central office respectively must have a light source which emits light at a predetermined wavelength. Further, a WDM-PON also has a problem of maintaining wavelengths assigned to respective subscribers. That is, the wavelength of a light source positioned at a CO must correspond to a transmission wavelength of a wavelength-division multiplexing (WDM) filter of the CO and a transmission wavelength of a WDM filter positioned at a remote node (RN). In addition, the wavelength of a light source positioned at an optical network termination (ONT) must correspond to a transmission wavelength of a WDM filter of the CO and a transmission wavelength of a WDM filter of the RN.

Generally, an arrayed waveguide grating (AWG) is used as a WDM filter. In the meanwhile, the wavelength of a light source may vary as ambient temperature varies and a transmission wavelength of a WDM filter also varies accordingly. Further, the installation positions of a light source and a WDM filter are different, each light source and a WDM filter undergo different changes of temperature. In addition, the change rates of wavelength characteristics for a light source and a WDM filter are different depending on temperature. Accordingly, there has been a problem that it is required to monitor, control and manage, etc. for a wavelength alignment between a temperature-sensitive light source and other optical components in a WDM-PON. In order to solve the above problem, a light source which operates wavelength-independently is necessarily required and the essence in WDM-PON is to embody a low-cost or cost-effective light source which operates wavelength-independently.

Among wavelength-independently operating light sources that have been suggested currently, it is recognized that a wavelength-locked F-P LD is the most low-cost or cost-effective light source among WDM-PONs.

As illustrated in FIG. 1, a wavelength-locked FP LD is comprised of a broadband light source (BLS) 30; an optical circulator 40 for separating light being injected through an optical fiber and wavelength-locked output light; a WDM filter 50 for multiplexing the light being injected; and an F-P LD 60 being oscillated in a multi-mode. When the BLS 30 is injected into the F-P LD 60 being oscillated in a multi-mode after passing through the WDM-filter 50, the F-P LD 60 oscillates in a quasi-single mode and is wavelength-locked by the injected light. Thus, adjacent modes are suppressed and mode partition noise is reduced. In addition, output light from the wavelength-locked F-P LD 60 passes the WDM filter 50 and is transmitted to a receiving end (not shown) of a CO.

FIG. 2 illustrates a WDM-PON system which employs a wavelength-locked F-P LD in accordance with a prior art. Referring to FIG. 2, a WDM-PON system in accordance with a prior art is comprised of a CO 100, a RN 200, and a plurality of ONTs 300. An AWG is employed as a first WDM filter 120a which is used at the CO 100 and a second WDM filter 210a which is used at the RN 200, respectively. The CO 100 is comprised of a BLS 130a, a first WDM filter 120a, and n-numbered optical transceivers 110a, ..., 110n. The plurality of ONTs 300 is connected to the RN 200 through a single-mode optical fiber. A wavelength-locked optical signal outputted from the CO 100 is de-multiplexed by a second WDM filter 210a of the RN 200 and is transmitted to receiving ends of respective ONTs 300. Light spectrum generated from the BLS 130a is flat. Light generated from the BLS 130a is filtered by the first WDM filter 120a of the CO 100 and is injected into respective F-P LDs 110a, ..., 110n of the CO 100. Also, light generated from the BLS 130a is filtered by the second WDM filter 210a of the RN 200 and is injected into respective F-P LDs 300a, ..., 300n of the plurality of ONTs 300. The respective F-P LDs 110a, ..., 110n of the CO 100 and the respective F-P LDs 300a, ..., 300n of the plurality of ONTs 300 are oscillated in a quasi-single mode and are wavelength-locked by injected light. Respective up-stream optical signals outputted from respective wavelength-locked F-P LDs 300a, ..., 300n and respective down-stream optical signals outputted from respective wavelength-locked F-P LDs 110a, ..., 110n undergo a filtering effect during respective multiplexing processes by the second WDM filter 210a of the RN 200 and the first WDM filter 120a of the CO 100.

Then, the respective up-stream optical signals and the respective downstream optical signals respectively pass a single-mode optical fiber and undergo again a filtering effect during respective de-multiplexing processes by the first WDM filter 120a of the CO 100 and the second WDM filter 210a of the RN 200. Those filtering effects have a problem in that they cause an increase in mode partition noise of a wavelength-locked F-P LD and thus cause degradation of a noise characteristic. Further, if injected light is positioned between oscillation modes of the F-P LDs 110a, . . . , 110n and 300a, . . . , 300n, degradation in noise characteristic more increases because two adjacent modes of an F-P LD 60 are selected depending on a bandwidth being injected and more optical power is lost by filtering. Therefore, the degradation in noise characteristic due to filtering causes a low performance of a WDM-PON employing wavelength-locked F-P LDs 110a, . . . , 110n and 300a, . . . , 300n, and also becomes an obstacle of wavelength-independence.

DISCLOSURE OF INVENTION

Technical Problem

The object of the present invention is to solve the prior art problems and provide a WDM-PON capable of a high speed transmission of 1 Gb/s or more by using a noise reduction effect of a wavelength-locked F-P LD maximally, capable of guaranteeing wavelength-independence sufficiently even when the wavelength of an F-P LD and the wavelength of a wavelength-division multiplexing filter may vary depending on a change of ambient temperature, and capable of minimizing crosstalk by an adjacent subscriber channel.

Technical Solution

According to one aspect of the present invention, the present invention provides a wavelength-division multiplexed passive optical network comprising a central office (CO); a remote node (RN) being connected to the CO by a single mode fiber; and one or more optical network terminations (ONTs) being connected to the RN by one or more single mode fibers, respectively, wherein the CO comprises: a broadband light source (BLS) for generating light to be injected; a first wavelength-division multiplexing (WDM) filter for filtering for the injected light generated from the BLS and having a bandwidth wider than a bandwidth of the injected light in order to minimize a filtering effect; and one or more optical transceiver having one or more F-P LDs into which light being filtered by the first WDM filter is injected; and wherein the RN filters the injected light generated from the BLS and injects the filtered light into the one or more ONTs; and wherein the RN comprises a second WDM filter having a bandwidth wider than a bandwidth of the injected light in order to minimize a filtering effect.

Further features and advantages of the present invention can be obviously understood with reference to the accompanying drawings where same or similar reference numerals indicate same components.

ADVANTAGEOUS EFFECTS

A wavelength-division multiplexed passive optical network for reducing degradation in a noise characteristic of a wavelength-locked F-P LD in accordance with the present invention has the following effects:

Firstly, when embodying a WDM-PON system employing a wavelength-locked F-P LD, it is possible to guarantee wavelength-independence sufficiently even if the wavelength of an F-P LD and the wavelength of a WDM filter may vary depending on a change of ambient temperature, and to minimize crosstalk by an adjacent subscriber channel.

Secondly, it is possible to increase optical power injected into an F-P LD in case of employing an optical amplifier-based broadband light source, because a bandwidth of injected light is not determined by a WDM filter, but is determined by a BLS.

Thirdly, it is possible to accomplish a high speed transmission of 1 Gb/s or more by using a noise reduction effect of a wavelength-locked F-P LD maximally, because a noise characteristic can be improved.

BRIEF DESCRIPTION OF THE DRAWINGS

FIG. 1 illustrates a structural view of a wavelength-locked F-P LD in accordance with a prior art.

FIG. 2 illustrates a structural view of a WDM-PON system which employs a wavelength-locked F-P LD in accordance with a prior art.

FIG. 3 illustrates a structural view of a WDM-PON system which employs a wavelength-locked F-P LD in accordance with the present invention.

FIG. 4 illustrates a circuit view of a broadband light source which employs a multi-stage optical amplifier and an optical filter in accordance with the present invention.

FIG. 5 illustrates a circuit view where an optical filter is added to a flat broadband light source in accordance with the present invention.

FIG. 6 illustrates an output spectrum of a wavelength-locked F-P LD when light is injected into near an oscillation mode of an F-P LD in accordance with the present invention.

FIG. 7 illustrates an output spectrum of a wavelength-locked F-P LD when light is injected into between oscillation modes of an F-P LD in accordance with the present invention.

FIG. 8 illustrates a schematic view of a WDM-PON system for reducing degradation of a noise characteristic in accordance with the present invention.

FIG. 9 illustrates an experimental result which measures a noise characteristic of a wavelength-locked F-P LD.

FIG. 10 illustrates a noise characteristic view of a wavelength-locked F-P LD depending on detuning values.

BEST MODE FOR CARRYING OUT THE INVENTION

Hereinafter, the present invention is described in more detail with reference to preferred embodiments thereof and the appended drawings.

FIG. 3 illustrates a structural view of a WDM-PON system which employs a wavelength-locked F-P LD in accordance with the present invention. As illustrated in FIG. 3, an embodiment of a WDM-PON system in accordance with the present invention employs an AWG, more specifically, a flat-top AWG having a flat-top type pass band as a first WDM filter 120b and a second WDM filter 210b. As illustrated in FIG. 3, an output spectrum of a BLS 130b is not flat, and the BLS 130b outputs optical power only at a wavelength of an optical channel which corresponds to a transmission wavelength being used by the first WDM filter 120b and the second WDM filter 210b for communicating with respective receiving ends 300a, . . . , 300n of an ONT 300. For the BLS 130b, any devices where a bandwidth through which injected light passes is narrower than a bandwidth through which an output from an F-P LD passes, or any combination thereof may be employed. More specifically, the BLS 130b employed in the present invention can be embodied as a two-stage optical amplifier 131 and an optical filter 132 inserted into and connected to between the two-stage optical amplifier 131 as illustrated in FIG. 4, or can be embodied by connecting an optical filter 132 having a non-flat output spectrum to a BLS 130a having a flat output spectrum as illustrated in FIG. 5. In an embodiment of the present invention illustrated in FIG. 4, the optical amplifier 132 is constructed in a two-stage shape, it is fully understood by a skilled person in the art that a three or higher stage filter can be employed.

In an embodiment of the present invention illustrated in FIG. 3 described above, the wavelength of a band pass of the optical filter 132 corresponds to the wavelength of a band pass which is used as the wavelengths of respective optical channels of the first WDM filter 120b in FIG. 3, while the bandwidth of the optical filter 132 is narrower than any of the bandwidths of the first WDM filter 120b and the second WDM filter 210b in FIG. 3. Further, because an optical signal being filtered by a comb filter 132 which performs filtering for respective channels so as to have more optical power only at a wavelength band where an optical signal is transmitted, is amplified again (i.e., an optical signal is saturated) in the two-stage optical amplifier 131 employed in FIG. 4, it is possible to increase optical power injected into an F-P LD, compared with a case of the BLS 130a having a flat output spectrum. Output light from the BLS 130b where a bandwidth thereof has been already determined by the optical filter 132 is inserted into the F-P LDs 300a, ..., 300n through the second WDM filter 210b of the RN 200 and the F-P LDs 110a, ..., 110n through the first WDM filter 120b of the CO 100, respectively, as illustrated in FIG. 3. Because the bandwidth of the inserted light is narrow, while the AWGs 120b, 210b have a flat pass bands and a wide bandwidth, output light from wavelength-locked F-P LD 110a, ..., 110n and 300a, ..., 300n undergoes a less filtering effect compared with a prior art WDM-PON as shown in FIG. 2. Accordingly, an embodiment of a WDM-PON system in accordance with the present invention has less degradation in a noise characteristic due to filtering. Further, it is desirable in the present invention to employ an F-P LD having a long-cavity length in order to increase a wavelength-locking effect, while employing an optical filter 132 having a narrow bandwidth as described above. When the cavity length is longer, it is possible to obtain lasers having a narrower mode spacing. As a result, it is possible to make two or more laser oscillation modes of an F-P LD being employed in the present invention to exist within a range of a bandwidth of filtered light being injected and thus to decrease a mode partition noise so that a more preferable transmission characteristic can be obtained.

The wavelengths of an F-P LD and a WDM filter may vary as ambient temperature changes and thus a wavelength characteristic of an F-P LD may also vary accordingly. Here, detuning is defined as a wavelength difference between a wavelength of injected light and a wavelength of a specific oscillation mode of an F-P LD. FIG. 6 illustrates a simulation result of an output spectrum of a wavelength-locked F-P LD when light is injected into near an oscillation mode of an F-P LD in accordance with the present invention. In a simulation experiment shown in FIG. 6, the following parameters are employed: a mode spacing of the F-P LD is 0.57 nm; a front facet reflectivity of the F-P LD is 1%; a driving current of the F-P LD is 1.2 times of a threshold current; a bandwidth of light being injected into the F-P LD is 54 GHz; and optical power injected into the F-P LD is −13 dBm/0.2 nm. In FIG. 6, a dotted line represents a spectrum before passing through a WDM filter and an adjacent mode can be seen to be suppressed approximately by 17 dB. A thick solid line represents a case corresponding to a prior art WDM-PON system as shown in FIG. 2, where a bandwidth of injected light is determined by a WDM filter, and shows a spectrum when an output of a wavelength-locked F-P LD is filtered by the same WDM filter. A thin solid line represents an embodiment of a WDM-PON in accordance with the present invention and shows a spectrum when an output of a wavelength-locked F-P LD is multiplexed by a WDM filter having a bandwidth (80 GHz) wider than a bandwidth of injected light. Both cases of the thick and thin solid lines have a very small difference in terms of optical power, when compared with a case of the dotted line (before being multiplexed). Accordingly, when filtered ASE light is injected near an oscillation mode of an F-P LD, adjacent modes are sufficiently suppressed and the optical power loss after being filtered is very small for both cases of the thick and thin solid lines so that an increase in noise is expected to be very small.

FIG. 7 illustrates an output spectrum of a wavelength-locked F-P LD when light is injected into between oscillation modes of an F-P LD in accordance with the present invention. Referring to FIG. 7, it can be seen that two modes of an F-P LD are wavelength-locked. In case of being multiplexed by a WDM filer having a bandwidth which is the same as that of injected light (thick solid line), the optical power loss is large. Accordingly, a noise due to after being filtered is expected to be increased due to a mode partition noise. On the contrary, in case of employing a WDM filter having a bandwidth wider than that of injected light (thin solid line), the optical power loss due to multiplexing is very small. In addition, in an output spectrum before being multiplexed (dotted line), a mode partition noise is expected to be sufficiently small because adjacent modes are suppressed approximately by 20 dB.

FIG. 8 illustrates a schematic view of a WDM-PON system for reducing degradation of a noise characteristic in accordance with the present invention. FIG. 9 illustrates an experimental result which measures a noise characteristic of a wavelength-locked F-P LD. In FIGS. 8 and 9, a bandwidth of light to be injected into an F-P LD is 31 GHz; optical power injected into the F-P LD is −11 dBm/0.2 nm; and a driving current of the F-P LD is 1.8 times of a threshold current. Referring to FIGS. 8 and 9, for an up-stream signal, a noise before passing through a WDM filter 50 (an AWG is employed for an embodiment shown in FIG. 8) is very low because a spectrum of an F-P LD 60 does not undergo a filtering effect (position (a) in FIG. 8) (thin solid line in FIG. 9). However, for a case corresponding to FIG. 2 where a bandwidth of injected light is determined by a WDM filter and an output from a wavelength-locked F-P LD by the same WDM filter is filtered, a part of the spectrum is filtered upon passing through the WDM filter 50 and a noise characteristic is degraded (position (b) in FIG. 8) (dotted line in FIG. 9). In case that a bandwidth (100 GHz) of multiplexing/de-multiplexing filters 20, 50 as provided by the present invention is wider than a bandwidth of injected light, a noise degradation due to filtering is reduced as can be seen from FIG. 9 (thick solid line). Thus, according to an embodiment of the present invention, a high speed transmission of 1 Gb/s or more can be accomplished by using an output noise reduction effect of a wavelength-locked F-P LD maximally, because it is possible to reduce degradation in a noise characteristic.

In the meanwhile, a noise characteristic due to filtering may vary depending on detuning. FIG. 10 illustrates a noise characteristic view of a wavelength-locked F-P LD as a function of detuning values. In an embodiment illustrated in FIG. 10, a bandwidth of light to be injected into an F-P LD is 31 GHz; optical power injected into the F-P LD is −17 dBm/0.2 nm; and a driving current of the F-P LD is 1.2 times of a threshold current. As can be seen from FIG. 10, because an embodiment proposed by the present invention is superior in terms of a noise characteristic to an extent of approximately 4 dB/Hz (corresponding to a difference value between the thin solid line and the thick solid line, when a relative intensity noise (RIN) is maximal, i.e., detuning value is approximately 0.15), wavelength-independence can be easily obtained when compared with a prior art WDM-PON. Further, the present invention has an advantage in that crosstalk by an adjacent channel is smaller that a prior art WDM-PON because a bandwidth of multiplexing/de-multiplexing filters proposed by the present invention is wider than a bandwidth of injected light. Moreover, it is possible to increase optical power injected into an F-P LD due to saturation of the optical amplifier 132, when employing a BLS as illustrated in FIG. 4.

INDUSTRIAL APPLICABILITY

As described above, a wavelength-division multiplexed passive optical network for reducing degradation in a noise characteristic of a wavelength-locked F-P LD in accordance with the present invention has the following effects:

Firstly, when embodying a WDM-PON system employing a wavelength-locked F-P LD, it is possible to guarantee wavelength-independence sufficiently even if the wavelength of an F-P LD and the wavelength of a WDM filter may vary depending on a change of ambient temperature, and to minimize crosstalk by an adjacent subscriber channel.

Secondly, it is possible to increase optical power injected into an F-P LD in case of employing an optical amplifier-based broadband light source, because a bandwidth of injected light is not determined by a WDM filter, but is determined by a BLS.

Thirdly, it is possible to accomplish a high speed transmission of 1 Gb/s or more by using a noise reduction effect of a wavelength-locked F-P LD maximally, because a noise characteristic can be improved.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A wavelength-division multiplexed passive optical network for reducing degradation in a noise characteristic of a wavelength-locked Fabry-Perot Laser Diode (F-P LD) comprising:
    a central office (CO);
    a remote node (RN) being connected to the CO by a single mode fiber; and
    one or more optical network terminations (ONTs) being connected to the RN by one or more single mode fibers, respectively,
    wherein the CO comprises:
        a broadband light source (BLS) for generating light to be injected;
        a first wavelength-division multiplexing (WDM) filter for filtering for the injected light generated from the BLS and having a bandwidth wider than a bandwidth of the injected light in order to minimize a filtering effect; and
        one or more optical transceiver having one or more F-P LDs into which light being filtered by the first WDM filter is injected; and
    wherein the RN filters the injected light generated from the BLS and injects the filtered light into the one or more ONTs; and
    wherein the RN comprises a second WDM filter having a bandwidth wider than a bandwidth of the injected light in order to minimize a filtering effect.

2. The wavelength-division multiplexed passive optical network of claim 1, wherein the F-P LD is an F-P LD having a plurality of oscillation modes within a range of the bandwidth of the injected light.

3. The wavelength-division multiplexed passive optical network of claim 1, wherein the BLS is any devices where a bandwidth through which the injected light passes is narrower than a bandwidth through which an output from the wavelength-locked F-P LD passes or any combination of said any devices.

4. The wavelength-division multiplexed passive optical network of claim 1, wherein the first WDM filter and the second WDM filter respectively are an arrayed waveguide grating.

5. The wavelength-division multiplexed passive optical network of claim 1, wherein the first WDM filter and the second WDM filter respectively are a flat-top type arrayed waveguide grating.

6. The wavelength-division multiplexed passive optical network of claim 1, wherein the BLS comprises a multi-stage optical amplifier; and an optical filter being inserted into and connected to between the multi-stage optical amplifier.

7. The wavelength-division multiplexed passive optical network of claim 6, wherein a pass band of the optical filter corresponds to a pass band of optical channels so as to have optical power for the respective optical channels, and a bandwidth of the optical filter is narrower than any of bandwidths of the first WDM filter and the second WDM filter.

8. The wavelength-division multiplexed passive optical network of claim 1, wherein the BLS comprises a BLS having a flat output spectrum and an optical filter being connected to the BLS having the flat output spectrum and having a non-flat output spectrum.

9. The wavelength-division multiplexed passive optical network of claim 8, wherein a pass band of the optical filter corresponds to a pass band of optical channels so as to have optical power for the respective optical channels, and a bandwidth of the optical filter is narrower than any of bandwidths of the first WDM filter and the second WDM filter.

* * * * *